United States Patent
Kashiwagi

(10) Patent No.: US 9,875,465 B2
(45) Date of Patent: Jan. 23, 2018

(54) PROCESS CONTROL DEVICE, PROCESS CONTROL METHOD, AND NON-TRANSITORY COMPUTER-READABLE MEDIUM

(71) Applicant: FUJI XEROX CO., LTD., Tokyo (JP)

(72) Inventor: Takaaki Kashiwagi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/040,547

(22) Filed: Feb. 10, 2016

(65) Prior Publication Data

US 2017/0017924 A1    Jan. 19, 2017

(30) Foreign Application Priority Data

Jul. 16, 2015  (JP) ................................. 2015-141734

(51) Int. Cl.
 *G06Q 10/10* (2012.01)
(52) U.S. Cl.
 CPC .................................. *G06Q 10/103* (2013.01)
(58) Field of Classification Search
 CPC ..................................................... G06Q 10/103
 USPC ......................................................... 717/104
 See application file for complete search history.

(56) References Cited

U.S. PATENT DOCUMENTS

| 2003/0126003 A1* | 7/2003 | vom Scheidt | G06Q 10/10 705/51 |
| 2005/0050479 A1* | 3/2005 | Bogdan | G06F 8/20 716/102 |
| 2007/0150562 A1* | 6/2007 | Stull | G06F 17/30893 709/223 |
| 2008/0027781 A1* | 1/2008 | vom Scheidt | G06Q 10/06 705/7.13 |

FOREIGN PATENT DOCUMENTS

JP    2006-215713 A    8/2006

* cited by examiner

*Primary Examiner* — John Chavis
(74) *Attorney, Agent, or Firm* — Oliff PLC

(57) ABSTRACT

In a process control device, a workflow definition unit defines a workflow made up of multiple pieces of work. A deferred status setting unit sets, to a deferred status, incomplete work from among the pieces of work constituting the workflow. If the deferred status is set, a proceeding unit provisionally accepts that a piece of work set to the deferred status has been performed and proceeds to a next piece of work. If a result of a piece of work set to a deferred status is a different result from a result that the proceeding unit provisionally accepted as having been performed, a remanding unit extracts a piece of work to be remanded back to a previous piece of work from among the pieces of work constituting the workflow, and remands the extracted piece of work back to the previous piece of work.

8 Claims, 12 Drawing Sheets

| WORK IDENTIFIER 310 | WORK NAME 320 | SUPERVISOR 330 | START DATE 340 | COMPLETION DATE 350 | STATUS 360 |
|---|---|---|---|---|---|
| W-1 | DOCUMENTATION CHECK | TARO FUJI | 1/15/2015 | 1/19/2013 | COMPLETE |
| W-2 | INPUT OF DOCUMENTATION CONTENT | JIRO KOBAYASHI | 2/9/2015 | | DEFERRED |
| W-3 | CONTENT CONSISTENCY CHECK | SABURO ABE | 2/14/2015 | | IN PROGRESS |
| W-4 | INSPECTION | HANAKO YAMADA | | | NOT STARTED |

| ORDER RULE IDENTIFIER 410 | WORK IDENTIFIER 420 | ORDER 430 |
|---|---|---|
| R-1 | W-1 | 1 |
| R-2 | W-2 | 2 |
| R-3 | W-3 | 3 |
| R-4 | W-4 | 4 |

| | WORK IDENTIFIER | EXECUTION PROHIBITED |
|---|---|---|
| 600 | W-1 | FALSE |
| | W-2 | FALSE |
| | W-3 | FALSE |
| | W-4 | TRUE |

| | WORK IDENTIFIER | INPUT | OUTPUT |
|---|---|---|---|
| 700 | W-1 | DOCUMENT A, DOCUMENT B | EXISTENCE CONFIRMATION INFORMATION |
| | W-2 | DOCUMENT A, DOCUMENT B | NAME, AGE, ADDRESS, INCOME, WORKPLACE |
| | W-3 | INCOME, WORKPLACE | PROVISIONAL INSPECTION RESULT |
| | W-4 | NAME, AGE, ADDRESS, INCOME, WORKPLACE | OFFICIAL INSPECTION RESULT |

FIG. 8

| TO-DO IDENTIFIER 810 | TO-DO NAME 820 | SUPERVISOR 830 | RELATED WORK 840 | COMPLETION DATE 850 | STATUS 860 |
|---|---|---|---|---|---|
| T-1 | WORKPLACE DEFICIENCY | TARO FUJI | W-1 | 1/19/2013 | COMPLETE |
| T-2 | INCOME CERTIFICATE ACQUISITION REQUEST | JIRO KOBAYASHI | W-2 | | IN PROGRESS |

800

PROCESS CONTROL DEVICE, PROCESS CONTROL METHOD, AND NON-TRANSITORY COMPUTER-READABLE MEDIUM

CROSS-REFERENCE TO RELATED APPLICATIONS

This application is based on and claims priority under 35 USC 119 from Japanese Patent Application No. 2015-141734 filed Jul. 16, 2015.

BACKGROUND

Technical Field

The present invention relates to a process control device, a process control method, and a non-transitory computer-readable medium.

SUMMARY

According to an aspect of the invention, there is provided a process control device including a workflow definition unit, a deferred status setting unit, a proceeding unit, and a remanding unit. The workflow definition unit defines a workflow made up of multiple pieces of work. The deferred status setting unit sets, to a deferred status, incomplete work from among the pieces of work constituting the workflow. If the deferred status is set, the proceeding unit provisionally accepts that a piece of work set to the deferred status has been performed and proceeds to a next piece of work. If a result of a piece of work set to a deferred status is a different result from a result that the proceeding unit provisionally accepted as having been performed, the remanding unit extracts a piece of work to be remanded back to a previous piece of work from among the pieces of work constituting the workflow, and remands the extracted piece of work back to the previous piece of work.

BRIEF DESCRIPTION OF THE DRAWINGS

An exemplary embodiment of the present invention will be described in detail based on the following figures, wherein:

FIG. 3 is an explanatory diagram illustrating an exemplary data structure of a work information table;

FIG. 4 is an explanatory diagram illustrating an exemplary data structure of a work order rules table;

FIG. 8 is an explanatory diagram illustrating an exemplary data structure of a to-do information table;

DETAILED DESCRIPTION

Hereinafter, an exemplary embodiment related to realizing the present invention will be described by way of example on the basis of the drawings.

Figure 1:
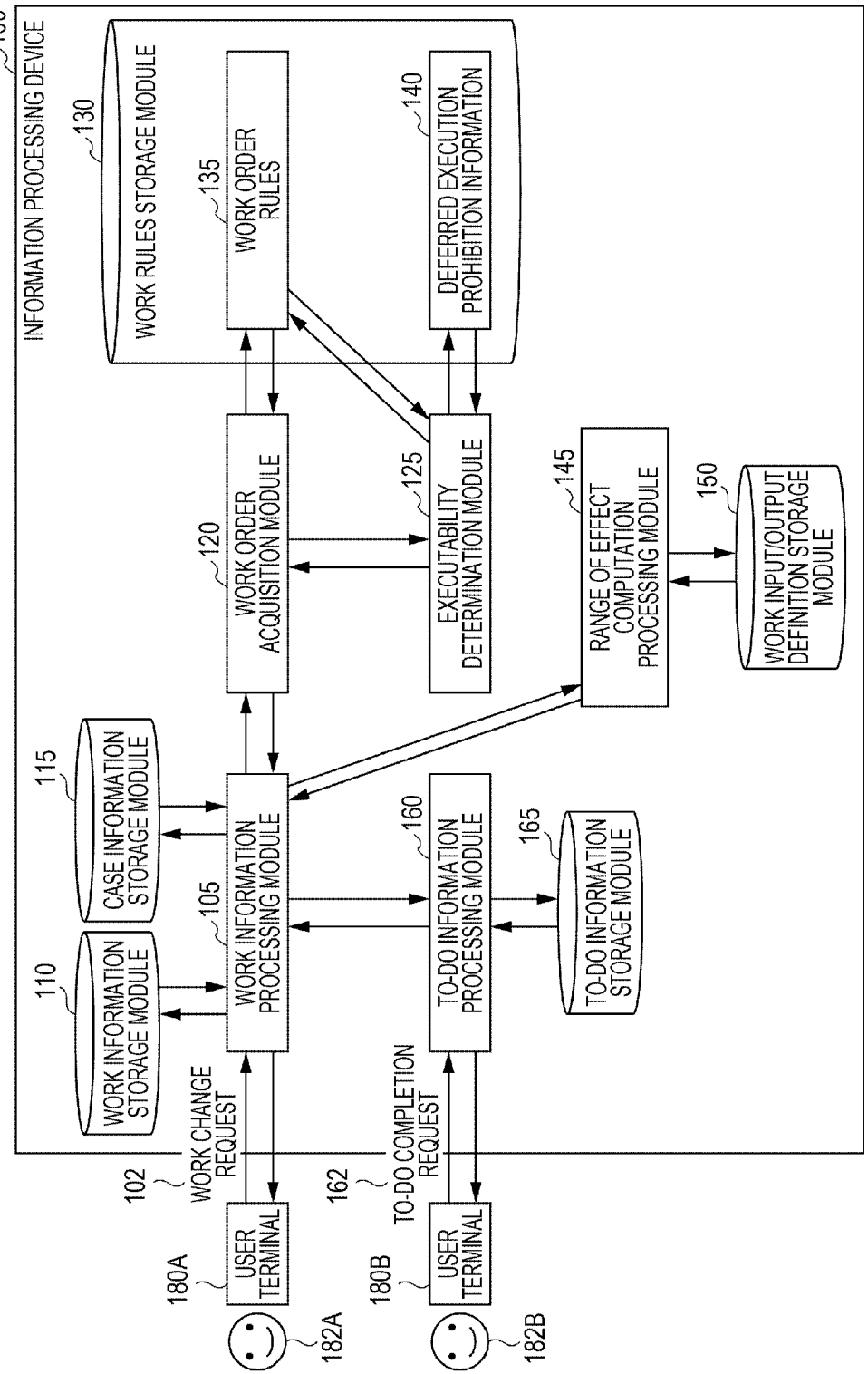
FIG. 1 is a schematic module configuration diagram for an exemplary configuration according to an exemplary embodiment.

FIG. 1 illustrates a schematic module configuration for an exemplary configuration according to the exemplary embodiment.

Note that the term module refers to components such as software (computer programs) and hardware which are typically capable of being logically separated. Consequently, the term module in the exemplary embodiment not only refers to modules in a computer program, but also to modules in a hardware configuration. Thus, the exemplary embodiment also serves as a description of a computer program (a program that causes a computer to execute respective operations, a program that causes a computer to function as respective units, or a program that causes a computer to realize respective functions), a system, and a method for inducing functionality as such modules. Note that although terms like "store" and "record" and their equivalents may be used in the description for the sake of convenience, these terms mean that a storage device is made to store information or that control is applied to cause a storage device to store information in the case where the exemplary embodiment is a computer program. Also, while modules may be made to correspond with function on a one-to-one basis, some implementations may be configured such that one program constitutes one module, such that one program constitutes multiple modules, or conversely, such that multiple programs constitute one module. Moreover, multiple modules may be executed by one computer, but one module may also be executed by multiple computers in a distributed or parallel computing environment. Note that a single module may also contain other modules. Also, the term "connection" may be used hereinafter to denote logical connections (such as the transfer of data and referential relationships between instructions and data) in addition to physical connections. The term "predetermined" refers to something being determined prior to the processing in question, and obviously denotes something that is determined before a process according to the exemplary embodiment starts, but may also denote something that is determined after a process according to the exemplary embodiment has started but before the processing in question, according to conditions or states at that time, or according to conditions or states up to that time. In the case of multiple "predetermined values", the predetermined values may be respectively different values, or two or more values (this obviously also includes the case of all values) which are the same. Additionally, statements to the effect of "B is conducted in the case of A" are used to denote that a determination is made regarding whether or not A holds true, and B is conducted in the case where it is determined that A holds true. However, this excludes cases where the determination of whether or not A holds true may be omitted.

Also, the terms "system" and "device" not only encompass configurations in which multiple computers, hardware, or devices are connected by a communication medium such as a network (including connections that support 1-to-1 communication), but also encompass configurations realized by a single computer, hardware, or device. The terms "device" and "system" are used interchangeably. Obviously, the term "system" does not include merely artificially arranged social constructs (social systems).

Also, every time a process is conducted by each module or every time multiple processes are conducted within a module, information to be processed is retrieved from a storage device, and the processing results are written back to the storage device after the processing. Consequently, description of the retrieval from a storage device before processing and the writing back to a storage device after processing may be reduced or omitted in some cases. Note that the storage device herein may include a hard disk, random access memory (RAM), an auxiliary or external storage medium, a storage device accessed via a communication link, and a register or the like inside a central processing unit (CPU).

An information processing device 100 having a function of acting as a process control device according to the present exemplary embodiment assists in the execution of work in a workflow, and as illustrated by the example of FIG. 1, includes a work information processing module 105, a work information storage module 110, a case information storage module 115, a work order acquisition module 120, an executability determination module 125, a work rules storage module 130, a range of effect computation processing module 145, a work input/output definition storage module 150, a to-do information processing module 160, and a to-do information storage module 165.

Process control according to a workflow is one method of making tasks more efficient in a system.

In a workflow, work to be performed as part of a task and the order in which to perform the work may be defined in advance. Also, by setting conditions, the work to perform may be changed depending on the situation. By introducing a workflow, it becomes possible to perform work efficiently without omissions.

However, flows defined by workflows in the past often do not adhere to the actual tasks, and even if workflows are introduced, some parts may not be fully supported by the system, or the introduction of workflows itself may be difficult.

One example of tasks which do not adhere to the workflow definition are provisionally accepted tasks in which work is deferred. Ordinarily, a workflow enables the start of the next work after the completion of the previous work, and does not enable the start of the next work while work is incomplete.

In such cases, a situation occurs in which the previous work is not completely finished, but moving on to the next work is desirable because the risk is small. The information processing device 100 is compatible with such situations.

Note that the terms used herein are defined as follows.

A workflow definition is a data set linking pieces of work from a start piece of work to an end piece of work with transition conditions between pieces of work.

Attributes are metadata attached to work and performance items (hereinafter also called to-do items). For example, attributes include information such as name, creation time, and status.

A case is one collection of task processes. In other words, a case is a group of processes executed in accordance with a workflow definition. For example, a case may be a series of processes for opening an account.

Case information is information that is referenced in the carrying out of tasks, and is generated information.

Pieces of work are individual processes to be performed in order to complete a case.

Input information is information referenced when performing work.

Output information is information generated when performing work.

Deferral refers to provisionally accepting that incomplete work from among the work constituting a workflow has been performed, even though the work is incomplete, in order to advance to the next work. However, the incomplete work is expected to be performed later and completed. For example, deferral may occur if a non-standard task not anticipated by the current workflow is produced, and the non-standard task is set as a performance item in the workflow. Herein, a "non-standard task" refers to a task that does not constitute part of the original workflow but is relevant to the completion of the workflow, and is different from the standard tasks defined by the workflow. In particular, a non-standard task may be a task produced partway through the advancement of the workflow, and may include "tasks derived from standard tasks during the process of the workflow".

Proceeding refers to provisionally accepting that work in a deferred state has been performed, and moving on to perform the next work.

Remanding refers to sending a process back to work that is to be performed again when the final result of work set to a deferred status is different from the result when provisionally accepting that the work was performed (in other words, the result that was expected when the work was deferred).

The work information processing module 105 is connected to the work information storage module 110, the case information storage module 115, the work order acquisition module 120, the range of effect computation processing module 145, the to-do information processing module 160, and a user terminal 180A. The work information processing module 105 sets incomplete work from among the work constituting the workflow to a deferred status.

Additionally, when the deferred status is set, the work information processing module 105 provisionally accepts that the deferred work has been performed and proceeds to the next work.

Next, if the result of work set to a deferred status is different from the expected result when provisionally accepting that the work was performed, the work information processing module 105 extracts work to be remanded back to the previous work from among the work constituting the workflow, and remands the work back to the previous work.

In addition, if the output information of provisionally accepted work changes, the work information processing module 105 may also extract, as remanded work, work that treats the output information of the provisionally accepted work as input information.

In addition, the work information processing module 105 may also prohibit the execution of work set by deferred execution prohibition information 140 in the work rules storage module 130. Additionally, if work set to a deferred status exists in work ahead of the work set by the deferred execution prohibition information 140, the work information processing module 105 may also prohibit the execution of the work set by the deferred execution prohibition information 140.

Specifically, when work in a workflow is executed, the work information processing module 105 requests a work update process, and a process of updating the work information storage module 110 and the case information storage module 115 is conducted. At this point, if the status of the work is updated to "complete" or "deferred", the work order acquisition module 120 is requested to acquire the work to be started next.

The process after acquiring work from the work order acquisition module 120 changes depending on the work in the previous steps prior to the acquired work.

If the status of the work in the previous steps is all complete, the status of the acquired work is changed to "in progress", and the process enters a state enabling a user 182 to execute the next work.

If at least one piece of work in a previous step is set to a deferred status, the status of the acquired work is processed according to two patterns, depending on the process result of the executability determination module 125 discussed later.

If the acquired work is executable, the status of the acquired work is changed to "in progress", and the process enters a state enabling the user 182 to execute the next work.

If the acquired work is not executable, the acquired work is not set to "in progress", and the process ends.

The work information storage module 110 is connected to the work information processing module 105. The work information storage module 110 manages information about work. The information about work includes attribute information such as "Status", "Identifier", "Work Name", and "Supervisor". In the "Status" attribute, "Deferred" may be set, in addition to information such as "Not Started", "In Progress", and "Complete". For example, the information about work is managed using a work information table 300. FIG. 3 is an explanatory diagram illustrating an exemplary data structure of the work information table 300. The work information table 300 includes a work identifier field 310, a work name field 320, a supervisor field 330, a start date field 340, a completion date field 350, and a status field 360. The work identifier field 310 stores a work identifier, which is an identifier for identifying work in a workflow uniquely in the present exemplary embodiment. The work name field 320 stores the name of the work indicated by the work identifier. The supervisor field 330 stores the supervisor of the work. The start date field 340 stores the start date of the work. The completion date field 350 stores the completion date of the work. The status field 360 stores the current status of the work (such as "Not Started", "In Progress", "Complete", or "Deferred").

The case information storage module 115 is connected to the work information processing module 105. The case information storage module 115 stores information referenced to perform work (input information) and information created through work (output information). For example, data about an application and the application details (such as a person's name and address) for a bank account application is included in the case information.

The work rules storage module 130 stores work order rules 135 and deferred execution prohibition information 140.

The work order rules 135 are accessed from the work order acquisition module 120 and the executability determination module 125. The work order rules 135 are information defining a workflow made up of multiple pieces of work (hereinafter also called a workflow definition). In addition, the order of the pieces of work (work order rules) are prescribed. A work order rules table 400 may be used as the work rules storage module 130, for example. FIG. 4 is an explanatory diagram illustrating an exemplary data structure of the work order rules table 400. The work order rules table 400 includes an order rule identifier field 410, a work identifier field 420, and an order field 430. The order rule identifier field 410 stores an order rule identifier, which is an identifier for identifying an order rule uniquely in the present exemplary embodiment. The work identifier field 420 stores the work identifier. The order field 430 stores the order within the workflow of the work indicated by the work identifier.

Figures 5, 6, 7:
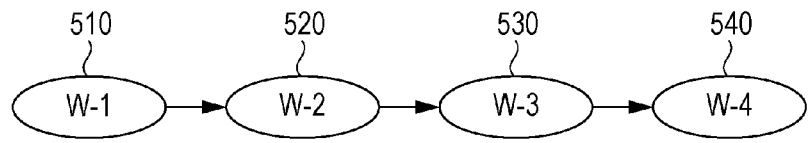
FIG. 5 is an explanatory diagram illustrating an example of a workflow.
FIG. 6 is an explanatory diagram illustrating an exemplary data structure of an execution prohibition information table.
FIG. 7 is an explanatory diagram illustrating an exemplary data structure of a work input/output definition table.

The work order rules table 400 illustrated by the example of FIG. 4 is information defining the workflow illustrated by the example of FIG. 5. In other words, the workflow illustrated by the example of FIG. 5 indicates that after the work of the W-1 work 510 is completed, the work of the W-2 work 520 is performed next, after the work of the W-2 work 520 is completed, the work of the W-3 work 530 is performed next, and after the work of the W-3 work 530 is completed, the work of the W-4 work 540 is performed next. Note that although this example illustrates a simple workflow, processes such as branching (in which multiple links extend from a single node) may also be included. In such cases, a field storing the work identifiers of the next work may be provided in the work order rules table 400.

The deferred execution prohibition information 140 is accessed from the executability determination module 125. The deferred execution prohibition information 140 is information setting work (work to be processed) whose execution is prohibited in the case in which deferred work exists prior to the work to be processed. The "work prior to the work to be processed" may be just the immediately previous work, or work executed before the work to be processed (in this case, there may be multiple prior pieces of work). Specifically, the deferred execution prohibition information 140 is a rule indicating whether or not the work to be processed may be executed if deferred work exists in the previous step prior to the work to be processed. An execution prohibition information table 600 may be used as the deferred execution prohibition information 140, for example. FIG. 6 is an explanatory diagram illustrating an exemplary data structure of the execution prohibition information table 600. The execution prohibition information table 600 includes a work identifier field 610 and an "Execution Prohibited" field 620. The work identifier field 610 stores the work identifier. The "Execution Prohibited" field 620 stores information indicating whether or not to prohibit execution if work conducted before the work indicated by the work identifier is in a deferred status. In the example of FIG. 6, "False" means that execution is available. In other words, the work is executable even if the prior work is in a deferred status. In other words, the prior work may be provisionally accepted and deferred until after the current work, but in some cases it may be desirable to perform the current work again when the deferred work changes to a completed status. "True" means that execution is prohibited. In other words, execution of the current work is prohibited if the prior work is in a deferred status. Consequently, the current work is unavailable for execution, and the work B following after the current work is also unavailable for execution. Even if the following work B is set to "False", since the work B is work to be conducted after work set to "True", execution of the work B is made unavailable.

The work order acquisition module 120 is connected to the work information processing module 105, the executability determination module 125, and the work order rules 135 of the work rules storage module 130. The work order acquisition module 120 references the work order rules 135 on the basis of specified work, and acquires the work to be performed next. After acquisition, the executability determination module 125 is requested to determine whether or not the acquired work may be executed.

The executability determination module 125 is connected to the work order acquisition module 120, the work order rules 135 of the work rules storage module 130, and the deferred execution prohibition information 140. The executability determination module 125 checks whether a deferred status exists in a previous step prior to the specified work. If at least one deferred status exists, the executability determination module 125 references the deferred execution prohibition information 140 to determine whether or not the specified work is executable.

For example, in the case of querying the executability determination module 125 about whether the work having the work identifier W-4 may be executed, taking the example illustrated in FIG. 4, the work W-1, W-2, and W-3 to be performed prior to W-4 are acquired from the work order rules 135, and the status from the work information storage module 110 is checked. If at least one of the three pieces of work is deferred, the executability determination module 125 references the deferred execution prohibition information 140, and taking the example illustrated in FIG. 6, since W-4 is True, the executability determination module 125 determines that execution is prohibited.

The work input/output definition storage module 150 is connected to the range of effect computation processing module 145. The work input/output definition storage module 150 stores definitions of information to be referenced by work (input information) and information to be generated (output information). In addition, the specific values of the information specified by the work input/output definition storage module 150 are stored in the case information storage module 115. For example, information is managed using a work input/output definition table 700. FIG. 7 is an explanatory diagram illustrating an exemplary data structure of the work input/output definition table 700. The work input/output definition table 700 includes a work identifier field 710, an input field 720, and an output field 730. The work identifier field 710 stores the work identifier. The input field 720 stores input information for the work indicated by the work identifier. The output field 730 stores output information for the relevant work.

With the work input/output definition table 700, the work of inputting information such as "Name", "Age", "Address", "Address", "Income", and "Workplace" while referring to "Document A" and "Document B" may be expressed as work having the work identifier W-2, for example.

In addition, the work having the work identifier W-3 may be expressed as being the work of determining a "Provisional Inspection Result" based on "Income" and "Workplace" input into the system by W-2.

The range of effect computation processing module 145 is connected to the work information processing module 105 and the work input/output definition storage module 150. The range of effect computation processing module 145 acquires, from the work input/output definition storage module 150 on the basis of specified work and output information, work to be performed again due to the output information being changed.

For example, in the work labeled W-2 in FIG. 7, if "Income" is changed, W-3 and W-4 are to be changed. This is because "Income" in the output field 730 for the work identifier W-2 exists in the input field 720 for the work identifiers W-3 and W-4. Similarly, if "Workplace" is changed, W-4 is to be changed. This is because "Workplace" in the output field 730 for the work identifier W-2 exists in the input field 720 for the work identifier W-4.

The to-do information storage module 165 is connected to the to-do information processing module 160. The to-do information storage module 165 manages information about to-do items. The to-do information includes "Related Work" and "Status" attributes. For example, information is managed using a to-do information table 800. FIG. 8 is an explanatory diagram illustrating an exemplary data structure of the to-do information table 800. The to-do information table 800 includes a to-do identifier field 810, a to-do name field 820, a supervisor field 830, a related work field 840, a completion date 850, and a status field 860. The to-do identifier field 810 stores a to-do identifier, which is an identifier for identifying a to-do item uniquely in the present exemplary embodiment. The to-do name field 820 stores the name of the to-do item indicated by the to-do identifier. The supervisor field 830 stores the supervisor of the to-do item. The related work field 840 stores the work (work identifier) related to the to-do item. In other words, the work identifier of the work to which the to-do is attached is stored. From the reverse perspective, the related work field 840 indicates that the to-do item was created by the relevant work. The completion date 850 stores the completion date of the to-do item. The status field 860 stores the status of the to-do item.

For example, when deferring the work referred to as "W-2", it may be desirable to create a to-do item for addressing the deferral. Provided that T-2 is the created to-do item, "W-2" is input into the related work like for T-2 in the to-do information table 800. The "Deferred" status is not included in the "Status" of the to-do item (status field 860).

Note that a to-do item is created when deferring work, for example. Specifically, a to-do item containing the reason why the work was deferred (the item that could not be executed) is created, and that to-do item is attached to the deferred work. When the to-do item is completed, the "Deferred" status of the work with the attached to-do item changes to the "In Progress" status. Finally, by executing the to-do item, the provisionally accepted work is completed. To-do items may also be collected together and displayed in a list.

The to-do information processing module 160 is connected to the work information processing module 105, the to-do information storage module 165, and the user terminal 180B. When an update (add, modify, or remove) of to-do information is requested, the to-do information processing module 160 conducts a process of updating the to-do information storage module 165.

When a to-do item created when work was deferred is completed, it is desirable to change the status of the deferred work to an executable status. For this reason, when the status of a to-do item is changed to "Complete" in the to-do information processing module 160, the work information processing module 105 is requested to change the status of the related work to "In Progress".

An overview of processes by the information processing device 100 will be illustrated.

A piece of work includes a "Deferred" status as a possible status. Like the "Complete" status, the "Deferred" status enables advancement to the next piece of work, but indicates that the deferred piece of work has not finished (that is, the work has been provisionally accepted).

"Deferred execution prohibition information" may be configured for a piece of work. If deferred work exists in a previous step, the current piece of work is made unavailable.

If a result that differs from the provisionally accepted result is produced when addressing a deferral, a range of effect is computed on the basis of the input information and output information of the work, and the work is remanded.

Specifically, in addition to the typical work statuses such as "Not Started", "In Progress", "Complete", and "Aborted", a "Deferred" status is also configured, and a workflow may be advanced to the next piece of work even when "Deferred" is selected. As a result, it is possible to advance to the next piece of work while the previous piece of work remains in an incomplete but provisional state. In addition, by explicitly indicating the deferred status, it becomes possible to grasp which pieces of work have not been completed.

In addition, "Deferred execution prohibition information" is configured as a work rule, and when the deferred execution prohibition information of the relevant piece of work is "True", and deferred work exists in a previous step, execution of the relevant piece of work is made unavailable. Consequently, it is possible to impose limits like "Do not start work if the previous work has not finished correctly", such as for approval work.

Also, by defining input information and output information for pieces of work, if the output information of a piece of work is changed, other pieces of work that treat the information set to the output information as input information may be extracted, and by changing the work status to "In Progress", the extracted pieces of work may be remanded. Consequently, even if provisionally accepted work is given a provisional result, a range of effect may be specified to enable work to be remanded.

The user terminal 180A is connected to the work information processing module 105 of the information processing device 100. The user terminal 180B is connected to the to-do information processing module 160 of the information processing device 100. Each user terminal 180 receives operations by a user 182, and executes work in a workflow. Specifically, the user terminal 180A issues a work change request 102 to the work information processing module 105 according to an operation by the user 182A. The user terminal 180B issues a to-do completion request 162 to the to-do information processing module 160 according to an operation by the user 182B.

Note that the user 182A and the user 182B may be the same person, or different persons. Also, the user terminal 180A and the user terminal 180B may be a single user terminal, or different user terminals.

Figure 2:
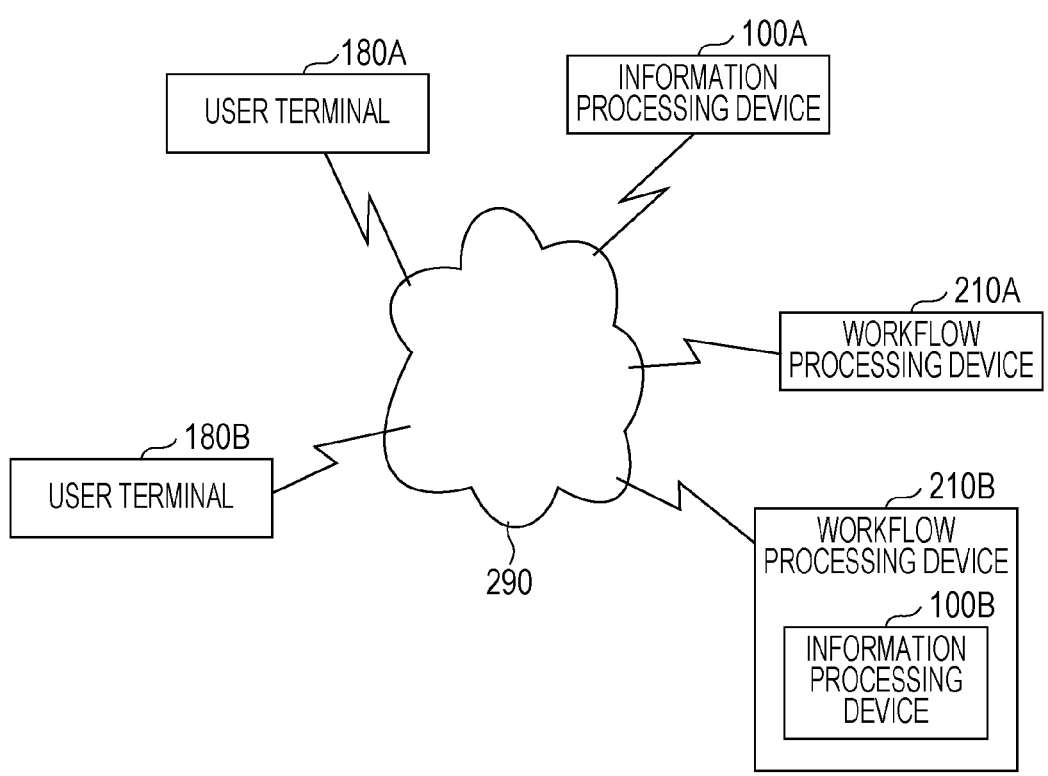
FIG. 2 is an explanatory diagram illustrating an exemplary system configuration utilizing an exemplary embodiment.

FIG. 2 is an explanatory diagram illustrating an exemplary system configuration utilizing an exemplary embodiment.

An information processing device 100A, a user terminal 180A, a user terminal 180B, a workflow processing device 210A, and a workflow processing device 210B are interconnected via a communication link 290. The communication link 290 may be wireless, wired, or a combination of the two, and may use a network such as the Internet or an intranet as a communication infrastructure, for example. Also, the functions provided by the information processing device 100, the workflow processing device 210A, and the workflow processing device 210B may also be realized as a cloud service. The workflow processing device 210B includes an information processing device 100B. In other words, the workflow processing device 210B includes a built-in information processing device 100 to manage workflows.

A workflow is specified by the information processing device 100 according to a user operation on the user terminal 180, and an execution instruction is issued. Subsequently, the workflow is followed and work is conducted by users assigned with respective work in the workflow, and information such as work content and work results are transmitted from the user terminals 180 to the information processing device 100. If a non-standard task not defined in the workflow is produced, a to-do item is created, the to-do item is provisionally accepted as having been performed, and that step of the workflow is proceeded with.

Figure 9:
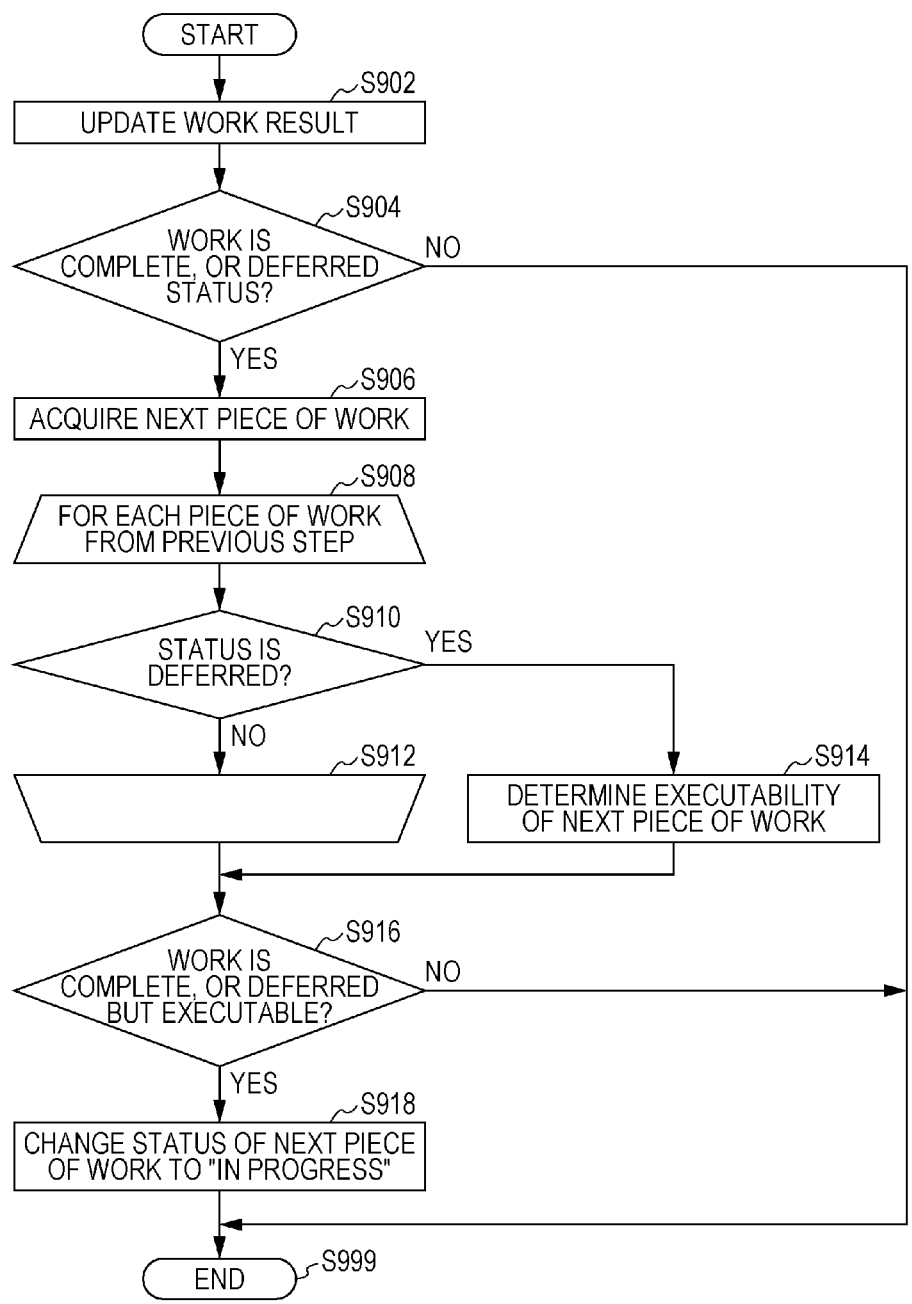
FIG. 9 is a flowchart illustrating an exemplary process according to an exemplary embodiment.

FIG. 9 is a flowchart illustrating an exemplary process according to the exemplary embodiment, and illustrates an example process when work is performed and a workflow advances to the next work.

In step S902, a work result is updated.

Specifically, when some kind of work is performed, the status in the work information storage module 110 and the information in the case information storage module 115 designated as the work output information are updated. The status is changed to the "Complete" status if the work is completely finished. If the work is provisionally accepted, the status is changed to "Deferred". If the work is canceled partway through, the status is changed to "Aborted", and so on.

Figure 11:
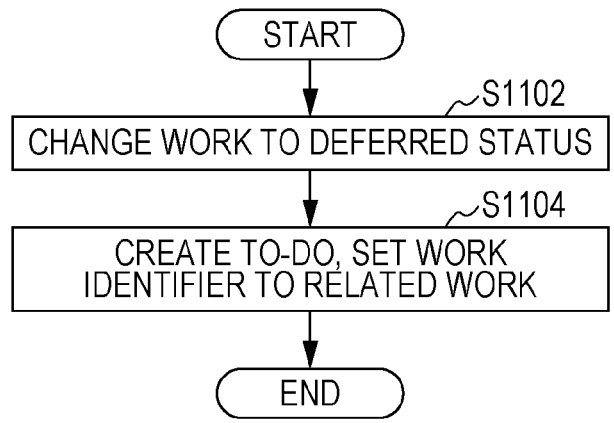
FIG. 11 is a flowchart illustrating an exemplary process according to an exemplary embodiment.

If the work status is changed to "Deferred" and the task to be performed is created as a to-do item, the flow illustrated by the example of FIG. 11 is performed.

In step S904, it is determined whether the work is in a complete or deferred status, and if in a complete or deferred status, the process proceeds to step S906. Otherwise (for example, if the work remains "In Progress"), the process ends (step S999).

In step S906, the next piece of work is acquired. Specifically, the work to be performed next is acquired by the work order acquisition module 120.

In step S908, the process up to step S912 is repeated for the number of acquired pieces of work in the previous step. Specifically, the work to be performed in a previous step prior to the work acquired by the work order acquisition module 120 is acquired, and a process is conducted for the number of pieces of work. Suppose that, in a case of performing work A, B, C, D, and E in order starting from A, the work of C has been completed. In this case, the next work is D, and the work of the previous steps is A, B, and C.

In step S910, it is determined whether or the status is deferred, and if deferred, the process proceeds to step S914. Otherwise, the process proceeds to step S912.

In step S914, the executability of the next piece of work is determined. Additionally, the process proceeds to step S916. Specifically, each piece of work from a previous step is inspected to determine whether the work is in a deferred state, and if at least one piece of work is in a deferred state, the executability determination module 125 is queried to determine whether or not the next piece of work is executable. In the executability determination module 125, a determination is made by checking the deferred execution prohibition information 140.

In step S916, it is determined whether or not the work is complete, or deferred but executable, and if complete or deferred but executable, the process proceeds to step S918. Otherwise, the process ends (step S999).

In step S918, the status of the next piece of work is changed to "In Progress". Specifically, the status in the work information storage module 110 is changed to "In Progress".

Figure 10:
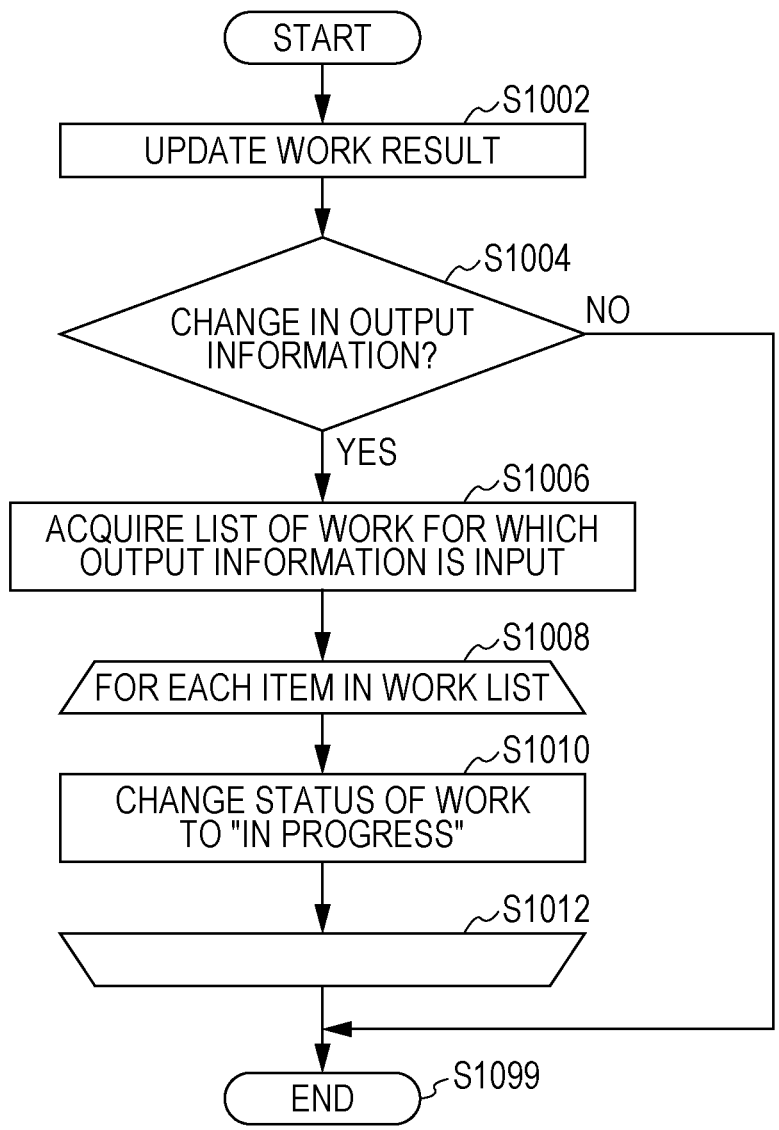
FIG. 10 is a flowchart illustrating an exemplary process according to an exemplary embodiment.

FIG. 10 is a flowchart illustrating an exemplary process according to the exemplary embodiment, and illustrates an example process in the case of performing work that had been provisionally accepted, and obtaining an unexpected result.

In step S1002, the work result is updated. Specifically, in the process for provisionally accepted work, the status of the work and the information in the case information storage module 115 designated as the output information are likewise updated, similarly to the updating of the work result illustrated by the example of FIG. 9 (step S902).

In step S1004, it is determined whether or not there is a change in the output information, and if there is a change, the process proceeds to step S1006. Otherwise, the process ends (step S1099). Specifically, if the information in the case information storage module 115 is updated (if there is a change in a value of the information), a remanding process is conducted to address an unexpected situation.

In step S1006, a list of work for which the output information is used as input is acquired. Specifically, to describe using the work input/output definition table 700 illustrated by the example of FIG. 7, if the output information "Income" of the work having the work identifier W-2 is changed, the work identifier W-3 and the work identifier W-4 for which "Income" is defined as input information are acquired.

In step S1008, the process up to step S1012 is repeated for the number of pieces of work in the work list.

In step S1010, the status of the work is changed to "In Progress".

FIG. 11 is a flowchart illustrating an exemplary process according to the exemplary embodiment, and illustrates an example process of creating a to-do item when work is deferred.

In step S1002, the work is changed to the deferred status.

In step S1104, a to-do item is created, and the work identifier is set as the related work. Specifically, the content of the to-do item is added to the to-do information storage module 165. At this point, the work identifier of the deferred work is set as the related work.

Figure 12:
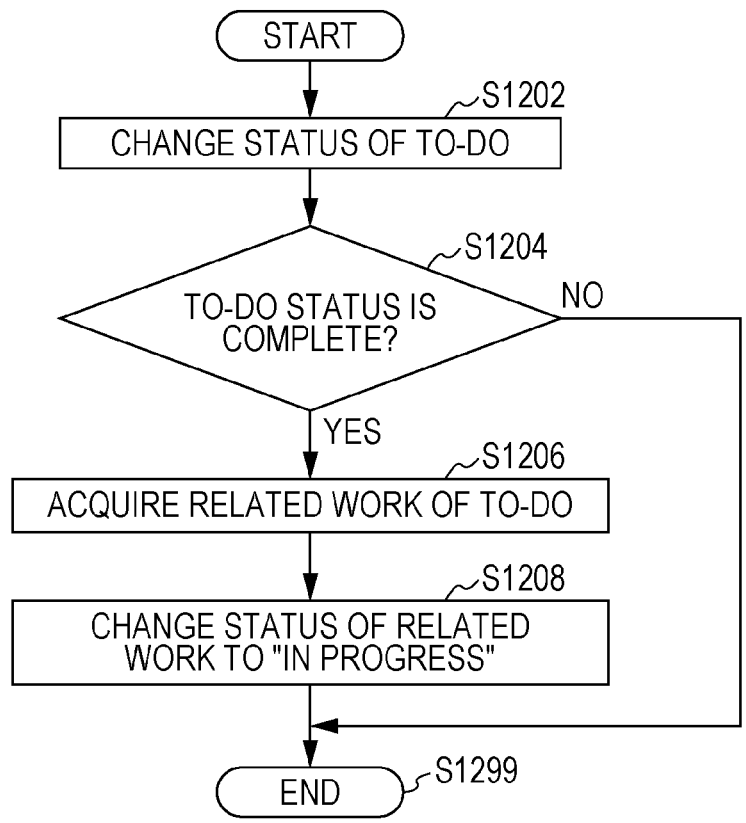
FIG. 12 is a flowchart illustrating an exemplary process according to an exemplary embodiment.

FIG. 12 is a flowchart illustrating an exemplary process according to the exemplary embodiment, and illustrates an example process in which a to-do is attached to provisionally accepted work, and the status of the to-do item changes to a completed state.

In step S1202, the status of the to-do item is changed. Specifically, the content of the to-do information storage module 165 is changed.

In step S1204, it is determined whether or not the to-do item is in a completed state, and if in a completed state, the process proceeds to step S1206. Otherwise, the process ends (step S1299).

In step S1206, the related work of the to-do item is acquired. Specifically, the work identifier set as the related work of the relevant to-do item is acquired from the to-do information storage module 165.

In step S1208, the status of the related work is changed to "In Progress". Specifically, the status of the work expressed by the acquired work identifier is changed to "In Progress" in the work information storage module 110.

Figure 13:
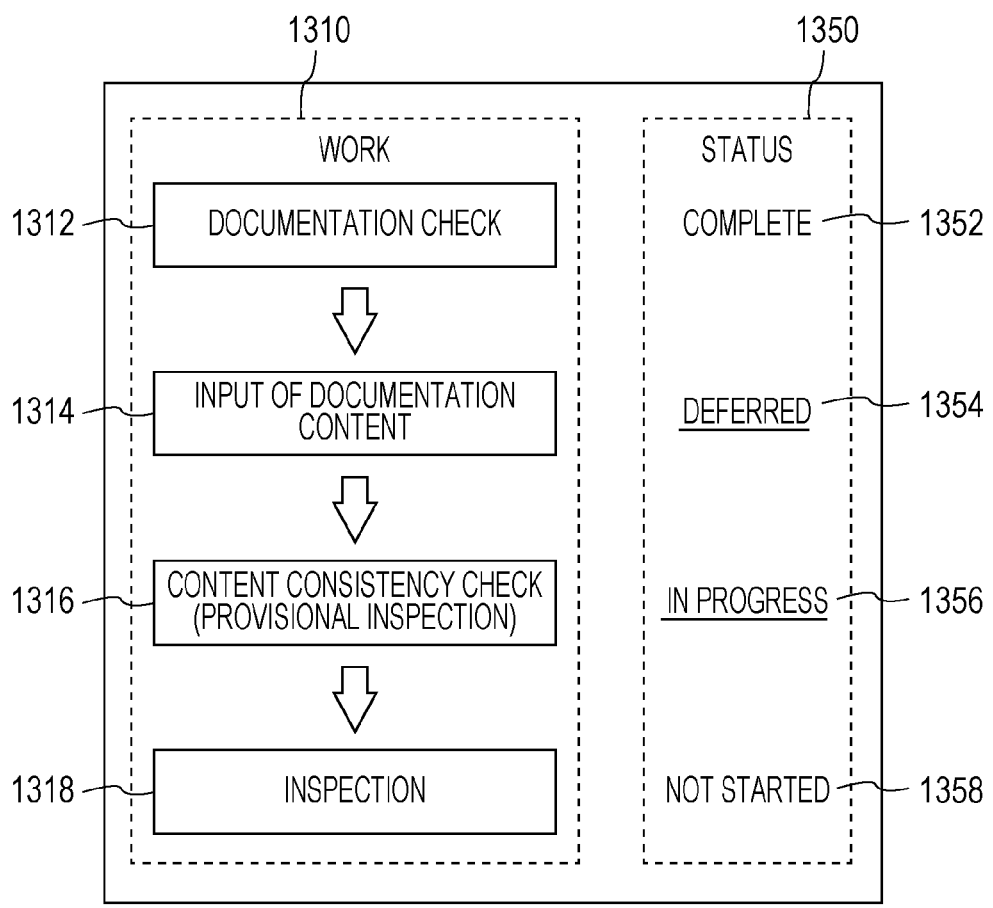
FIG. 13 is an explanatory diagram illustrating an exemplary display of a work list.

FIG. 13 is an explanatory diagram illustrating an example display of a work list 1300. The work list 1300 is the result of displaying a process result from the information processing device 100 on a liquid crystal display or other display device of the user terminal 180 (this applies similarly to the work list 1400 and the work list 1500 discussed later).

The work list 1300 expresses a work list in the case of deferring a piece of work and advancing to the next piece of work.

The content of the workflow (ordered work) is displayed in a workflow display area 1310, while the status of each piece of work is displayed in a status display area 1350.

The work 1312 is "Documentation Check". The status of the work 1312 at this time is Complete 1352.

The work 1314 is "Input of Documentation Content". The status of the work 1314 at this time is Deferred 1354.

The work 1316 is "Content Consistency Check (Provisional Inspection)". The status of the work 1316 at this time is In Progress 1356.

The work 1318 is "Inspection". The status of the work 1318 at this time is Not Started 1358.

For example, suppose that the "Input of Documentation Content" work 1314 involves checking the income field on a loan application against the income stated on an income certificate, and inputting the income into the system.

The income certificate has not arrived yet, so the income stated on the application (¥5,000,000) is temporarily input into the system, and the work 1314 is provisionally accepted with a status of Deferred 1354.

Consequently, in the "Content Consistency Check (Provisional Inspection)" work 1316, the status is In Progress 1356, and the work is in an executable state.

Figure 14:
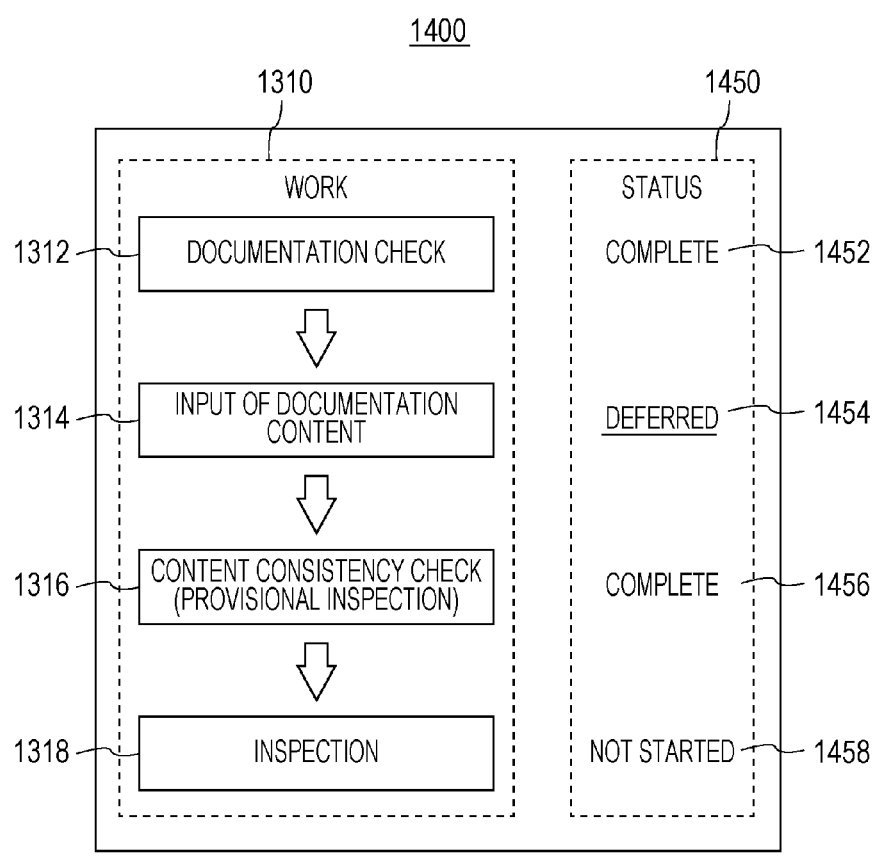
FIG. 14 is an explanatory diagram illustrating an exemplary display of a work list.

FIG. 14 is an explanatory diagram illustrating an example display of a work list 1400.

The work list 1400 expresses a work list in the case in which non-executable work exists when deferring work. In this case, the status of the "Content Consistency Check (Provisional Inspection)" work 1316 becomes Complete 1456, but since deferred work exists, the status of the "Inspection" work 1318 does not change to In Progress, and the status remains Not Started 1458.

The status of the work 1312 at this time is Complete 1452.
The status of the work 1314 at this time is Deferred 1454.
The status of the work 1316 at this time is Complete 1456.
The status of the work 1318 at this time is Not Started 1458.

For example, the provisional inspection (work 1316) was finished with the provisionally input value of ¥5,000,000 as the income, but the "Inspection" work 1318 is unavailable until the income certificate arrives and the income is confirmed. Specifically, the "Execution Prohibited" field 620 in the execution prohibition information table 600 is "True" for the work 1318, and thus the status of the work 1318 is set to Not Started 1458 (waiting for "Complete" in the work 1314).

Figure 15:
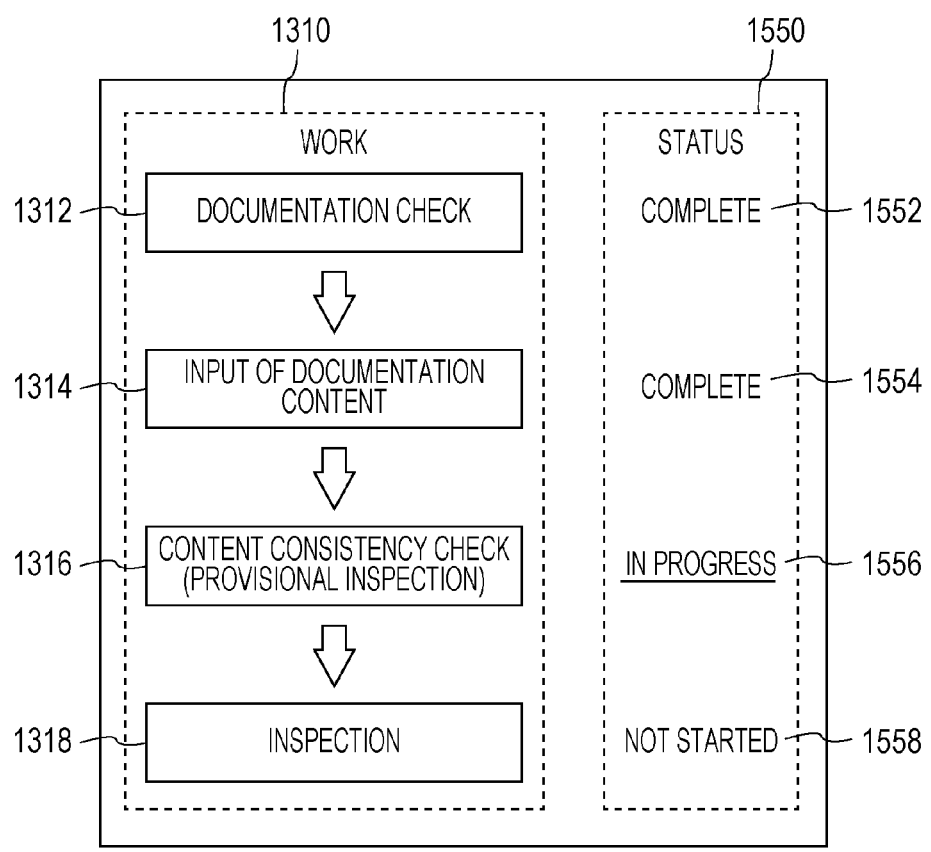
FIG. 15 is an explanatory diagram illustrating an exemplary display of a work list.

FIG. 15 is an explanatory diagram illustrating an example display of a work list 1500.

The work list 1500 expresses a work list in the case in which a deferral is addressed, but the result is unexpected.

The status of the work 1312 at this time is Complete 1552.
The status of the work 1314 at this time is Complete 1554.
The status of the work 1316 at this time is In Progress 1556.
The status of the work 1318 at this time is Not Started 1558.

For example, if the income certificate arrives, and checking the income reveals that the income is ¥4,000,000, the correct income is input, and the status of the work 1314 is changed to Complete 1554.

At this point, the status of the "Content Consistency Check (Provisional Inspection)" work 1316, which uses income as input information, is remanded to In Progress 1556.

The status of the Inspection work 1318 was Not Started 1558 (Not Started 1358) to begin with, and thus the Inspection work 1318 is not remanded.

Figure 16:
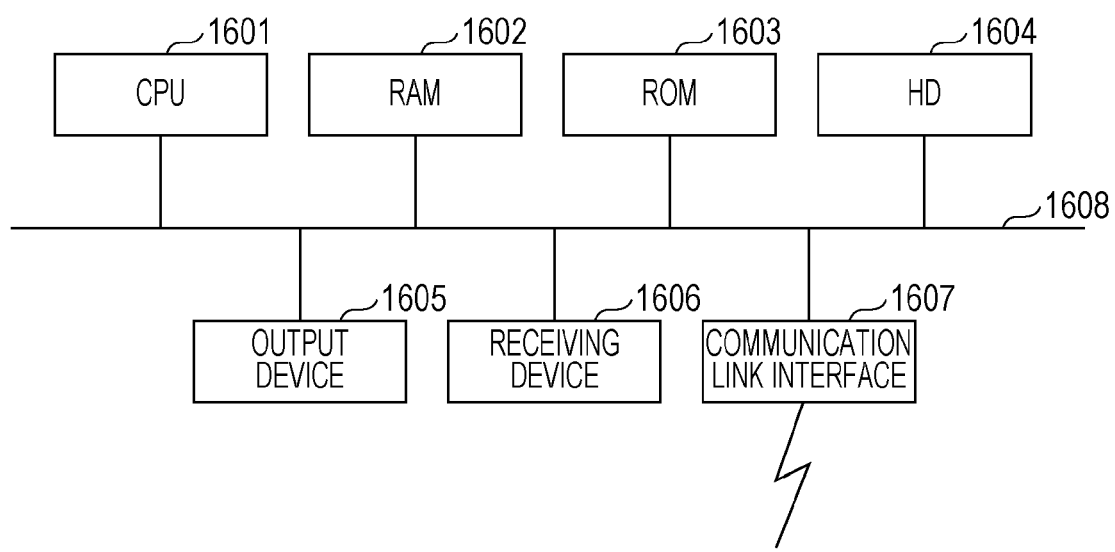
FIG. 16 is a block diagram illustrating an exemplary hardware configuration of a computer that realizes an exemplary embodiment.

Note that a hardware configuration of a computer executing a program that acts as the present exemplary embodiment is a general computer as illustrated by the example of FIG. 16, and specifically is a computer or the like that may be a personal computer or a server. In other words, as a specific example, a CPU 1601 is used as a processing unit (computational unit), while RAM 1602, ROM 1603, and an HD 1603 are used as storage devices. For the HD 1604, a hard disk or a solid-state drive (SSD) may be used, for example. The computer is made up of the CPU 1601 that executes programs such as the work information processing module 105, the work order acquisition module 120, the executability determination module 125, the range of effect computation processing module 145, and the to-do information processing module 160, the RAM 1602 that stores such programs and data, the ROM 1603 that stores programs and the like for activating the computer, the HD 1604 which is an auxiliary storage device (and may also be flash memory or the like) that functions as modules such as the work information storage module 110, the case information storage module 115, the work rules storage module 130, the work input/output definition storage module 150, and the to-do information storage module 165, a receiving device 1606 that receives data on the basis of operations performed by a user with device such as a keyboard, mouse, touch panel, or microphone, an output device 1605 such as a CRT, liquid crystal display, or a speaker, a communication link interface 1607 such as a network interface card for connecting to a communication network, and a bus 1608 for joining and exchanging data with the above components. Multiple such computers may also be connected to each other by a network.

Of the foregoing exemplary embodiments, for those made up of a computer program, software in the form of a computer program is made to be read into a system with the above hardware configuration, and the foregoing exemplary embodiments are realized by the cooperative action of the software and hardware resources.

Note that the hardware configuration illustrated in FIG. 16 illustrates a single exemplary configuration, and that the exemplary embodiment is not limited to the configuration illustrated in FIG. 16 insofar as the configuration still enables execution of the modules described in the exemplary embodiment. For example, some modules may also be realized with special-purpose hardware (such as an application-specific integrated circuit (ASIC), for example), and some modules may be configured to reside within an external system and be connected via a communication link. Furthermore, it may also be configured such that multiple instances of the system illustrated in FIG. 16 are connected to each other by a communication link and operate in conjunction with each other. Additionally, besides a personal computer in particular, an exemplary embodiment may also be incorporated into a device such as a mobile information/communication device (including devices such as a mobile phone, a smartphone, mobile equipment, and a wearable computer), information appliance, robot, photocopier, fax machine, scanner, printer, or multi-function device (that is, an image processing device having two or more from among scanning, printing, copying, and faxing functions).

Note that the described program may be provided stored in a recording medium, but the program may also be provided via a communication medium. In this case, a computer-readable recording medium storing a program, for example, may also be taken to be an exemplary embodiment of the present invention with respect to the described program.

A "computer-readable recording medium storing a program" refers to a computer-readable recording medium upon which a program is recorded, and which is used in order to install, execute, and distribute the program, for example.

The recording medium may be a Digital Versatile Disc (DVD), encompassing formats such as DVD-R, DVD-RW, and DVD-RAM defined by the DVD Forum and formats such as DVD+R and DVD+RW defined by DVD+RW Alliance, a compact disc (CD), encompassing formats such as read-only memory (CD-ROM), CD Recordable (CD-R), and CD Rewritable (CD-RW), a Blu-ray Disc (registered trademark), a magneto-optical (MO) disc, a flexible disk (FD), magnetic tape, a hard disk, read-only memory (ROM), electrically erasable and programmable read-only memory (EEPROM (registered trademark)), flash memory, random access memory (RAM), or a Secure Digital (SD) memory card, for example.

In addition, all or part of the above program may also be recorded to the recording medium and saved or distributed, for example. Also, all or part of the above program may be communicated by being transmitted using a transmission medium such as a wired or wireless communication network used in a local area network (LAN), a metropolitan area network (MAN), a wide area network (WAN), an internet, an intranet, an extranet, or some combination thereof, or alternatively, by being modulated onto a carrier wave and propagated.

Furthermore, the above program may be part of another program, and may also be recorded to a recording medium together with other separate programs. The above program may also be recorded in a split manner across multiple recording media. The above program may also be recorded in a compressed, encrypted, or any other recoverable form.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. A process control device comprising:
a workflow definition unit that defines a workflow made up of a plurality of pieces of work;
a deferred status setting unit that sets, to a deferred status, incomplete work from among the pieces of work constituting the workflow;
a proceeding unit that, if the deferred status is set, provisionally accepts that a piece of work set to the deferred status has been performed and proceeds to a next piece of work; and a remanding unit that, if a result of a piece of work set to the deferred status is a different result from a result that the proceeding unit provisionally accepted as having been performed,
- extracts the piece of work to be remanded back to a previous piece of work from among the pieces of work constituting the workflow,
- and remands the extracted piece of work back to the previous piece of work.

2. The process control device according to claim 1, wherein
if output information of the provisionally accepted piece of work is changed, the remanding unit extracts, as a remanded piece of work, a piece of work that treats the output information of the provisionally accepted piece of work as input information.

3. The process control device according to claim 1, further comprising:
a prohibited work setting unit that sets a piece of work whose execution is prohibited if the deferred status exists.

4. The process control device according to claim 2, further comprising:
a prohibited work setting unit that sets a piece of work whose execution is prohibited if the deferred status exists.

5. The process control device according to claim 3, further comprising:
a work prohibition unit that prohibits execution of a piece of work set by the prohibited work setting unit, wherein
if a piece of work set to the deferred status exists among work preceding the piece of work set by the prohibited work setting unit, the work prohibition unit prohibits execution of the piece of work set by the prohibited work setting unit.

6. The process control device according to claim 4, further comprising:
a work prohibition unit that prohibits execution of a piece of work set by the prohibited work setting unit, wherein
if a piece of work set to the deferred status exists among work preceding the piece of work set by the prohibited work setting unit, the work prohibition unit prohibits execution of the piece of work set by the prohibited work setting unit.

7. A process control method comprising:
defining a workflow made up of a plurality of pieces of work;
setting, to a deferred status, incomplete work from among the pieces of work constituting the workflow;
if the deferred status is set,
provisionally accepting that a piece of work set to the deferred status has been performed and proceeding to a next piece of work; and
if a result of a piece of work set to the deferred status is a different result from a result provisionally accepted as having been performed,
extracting the piece of work to be remanded back to a previous piece of work from among the pieces of work constituting the workflow,
and remanding the extracted piece of work back to the previous piece of work.

8. A non-transitory computer-readable medium storing a program causing a computer to execute a process for controlling a process, the process comprising:
defining a workflow made up of a plurality of pieces of work;
setting, to a deferred status, incomplete work from among the pieces of work constituting the workflow;
if the deferred status is set,
provisionally accepting that a piece of work set to the deferred status has been performed and proceeding to a next piece of work; and
if a result of a piece of work set to the deferred status is a different result from a result provisionally accepted as having been performed,
extracting the piece of work to be remanded back to a previous piece of work from among the pieces of work constituting the workflow,
and remanding the extracted piece of work back to the previous piece of work.

* * * * *